US012764048B2

(12) United States Patent
Amin et al.

(10) Patent No.: US 12,764,048 B2
(45) Date of Patent: Oct. 13, 2026

(54) CORRELATION OF SUBSCRIBER-SPECIFIC CALL FLOW PROCEDURES WITH SERVICE DISCOVERY PROCEDURES

(71) Applicant: T-Mobile USA, Inc., Bellevue, WA (US)

(72) Inventors: Rahul Amin, Issaquah, WA (US); Shane Metcalf, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 101 days.

(21) Appl. No.: 18/809,093

(22) Filed: Aug. 19, 2024

(65) Prior Publication Data

US 2026/0052089 A1 Feb. 19, 2026

(51) Int. Cl.
*H04L 61/4541* (2022.01)
*H04L 43/10* (2022.01)

(52) U.S. Cl.
CPC .......... *H04L 43/10* (2013.01); *H04L 61/4541* (2022.05)

(58) Field of Classification Search
CPC ............................ H04L 43/10; H04L 61/4541
See application file for complete search history.

(56) References Cited

U.S. PATENT DOCUMENTS

2004/0121775 A1* 6/2004 Ropolyi ................ H04W 24/00 455/445
2022/0248212 A1* 8/2022 Wang ...................... H04W 8/20
2025/0219924 A1* 7/2025 Weber, Jr. ............... H04L 43/10
2025/0280066 A1* 9/2025 Amin .................. H04M 3/2218
2026/0121949 A1* 4/2026 Amin .................. H04L 41/5058

* cited by examiner

*Primary Examiner* — Kamal M Hossain
(74) *Attorney, Agent, or Firm* — Lee & Hayes, P.C.

(57) ABSTRACT

Described herein are computing device(s) configured to identify first hostnames, parameters, or values for each call leg included in a call flow trace associated with a subscriber-specific identifier. The computing device(s) may also be configured to identify second hostnames, parameters, or values from network function (NF) service discovery procedures based on the first hostnames, parameters, or values and determine a best match NF service discovery procedure for the call flow trace based on correlation(s) between the first hostnames, parameters, or values and the second hostnames, parameters, or values.

20 Claims, 4 Drawing Sheets

CORRELATION OF SUBSCRIBER-SPECIFIC CALL FLOW PROCEDURES WITH SERVICE DISCOVERY PROCEDURES

BACKGROUND

Call requests, such as a call attach, invoke multiple procedures, but only some of these procedures contain subscriber-specific parameters that enable the procedures to be stitched by tracing tools into call flows. Other invoked procedures, such as network function (NF) service discovery procedures, do not include subscriber-specific parameters and cannot be stitched into a call flow on the basis of subscriber-specific parameters. The use of subscriber-specific parameters for stitching a call flow is important as it allows analysis of a call flow by international mobile subscriber identity (IMSI) or mobile station international subscriber directory number (MSISDN). An user desiring to analyze tracing tool output for an IMSI or MSISDN (e.g., for a call failure) can only obtain a partial call flow for it and must manually data mine stored network traffic for procedures that are not included, such as the NF service discovery procedures. This can delay issue resolution and lead to degraded network quality and poor customer experience.

BRIEF DESCRIPTION OF THE DRAWINGS

The detailed description is set forth with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed in part to techniques for determining a best match network function (NF) service discovery procedure for a call flow trace associated with a subscriber-specific identifier. The NF service discovery procedures may not include any subscriber-specific identifiers, and by ascertaining the NF service discovery procedure most likely associated with a specific subscriber-specific identifier the techniques may determine the best match.

To determine the best match, the techniques may first identify first hostnames, parameters, or values for each call leg included in a call flow trace associated with the specific subscriber-specific identifier. The techniques may then identify second hostnames, parameters, or values from the NF service discovery procedures based on the first hostnames, parameters, or values. The techniques may then determine the best match based on correlation(s) between the first hostnames, parameters, or values and the second hostnames, parameters, or values. In some implementations, the best match NF service discovery procedure may then be stitched with the call flow trace to produce an end-to-end call flow.

In various implementations, the subscriber-specific identifier may be an international mobile subscriber identity (IMSI) or a mobile station international subscriber directory number (MSISDN) received through a tracing tool, the tracing tool either receiving the IMSI/MSISDN from a user or an application. Such a query may result from a network failure (e.g., failed call) associated with the IMSI/MSISDN. The querier may be using the tracing tool and the end-to-end call flow it produces to identify a node or call leg associated with the failure.

Figure 1:
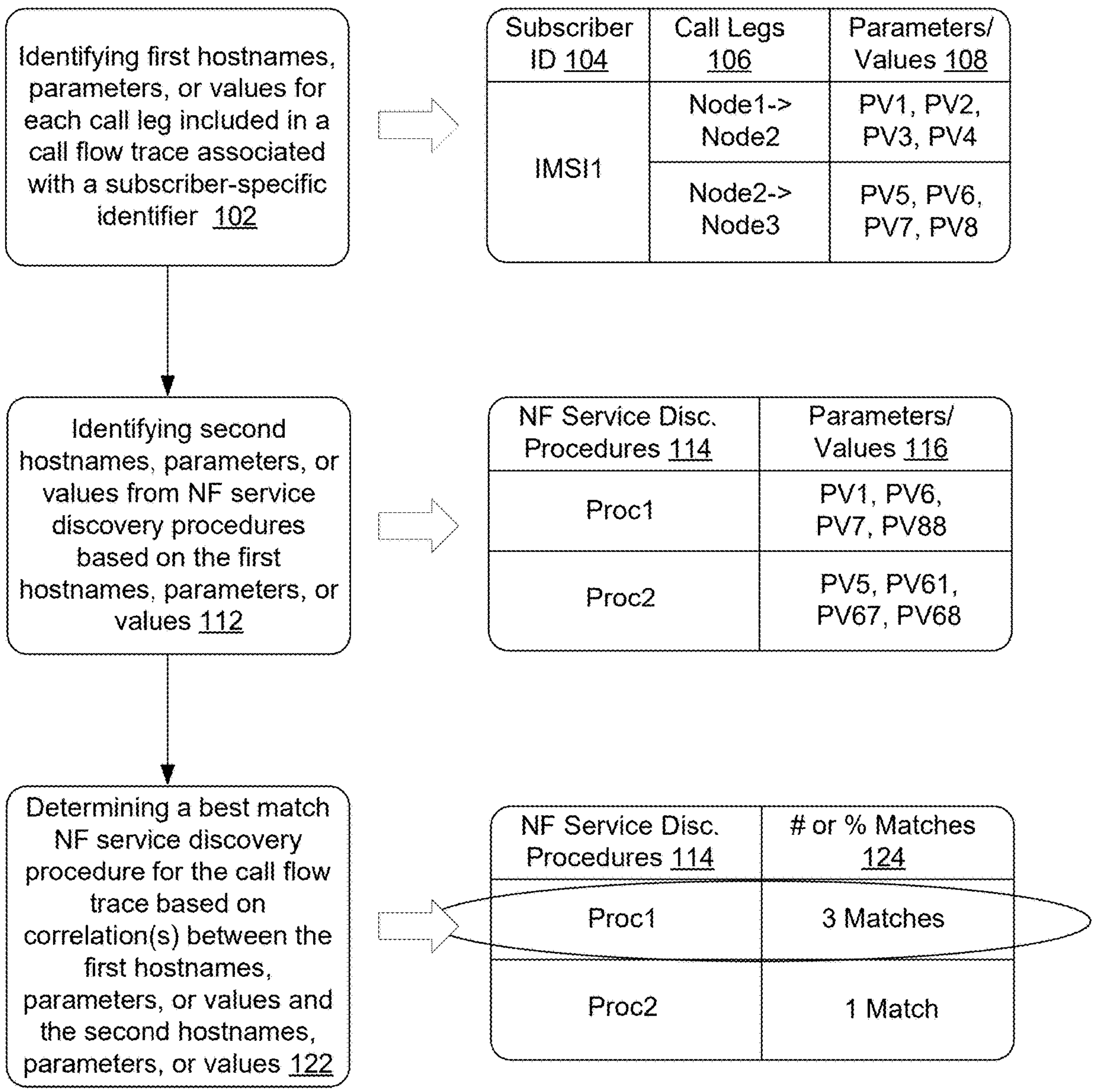
FIG. 1 shows operations of a process and tables of output for each of the operations, the operations and outputs both illustrating a technique for determining a best match network function (NF) service discovery procedure for a call flow trace associated with a subscriber-specific identifier based on correlation(s) between hostnames, parameters, or values taken from each of the NF service discovery procedure and the call flow trace.

FIG. 1 shows operations of a process and tables of output for each of the operations, the operations and outputs both illustrating a technique for determining a best match network function (NF) service discovery procedure for a call flow trace associated with a subscriber-specific identifier based on correlation(s) between hostnames, parameters, or values taken from each of the NF service discovery procedure and the call flow trace. As illustrated, at 102, technique(s) may identify first hostnames, parameters, or values for each call leg included in a call flow trace associated with the specific subscriber-specific identifier. The result-retrieved from querying based on the subscriber-specific identifier 104, includes call legs 106 for a call associated with the subscriber-specific identifier 104 and hostnames, parameters, or values 108 (also referred to herein as parameters or values 108 or parameters/values 108) for each call leg 106. The technique(s) may then identify, at 112, second hostnames, parameters, or values from the NF service discovery procedures based on the first hostnames, parameters, or values. For each service discovery procedure 114, the technique(s) may identify the associated hostnames, parameters, or values 116. At 122, the technique(s) then determine a best match NF service discovery procedure 114 for the call flow trace based on correlation(s) between the first hostnames, parameters, or values 108 and the second hostnames, parameters, or values 116. The result of the correlation(s) may be a number or percentage of matches 124, and the technique(s) may select the highest of these.

Figure 2:
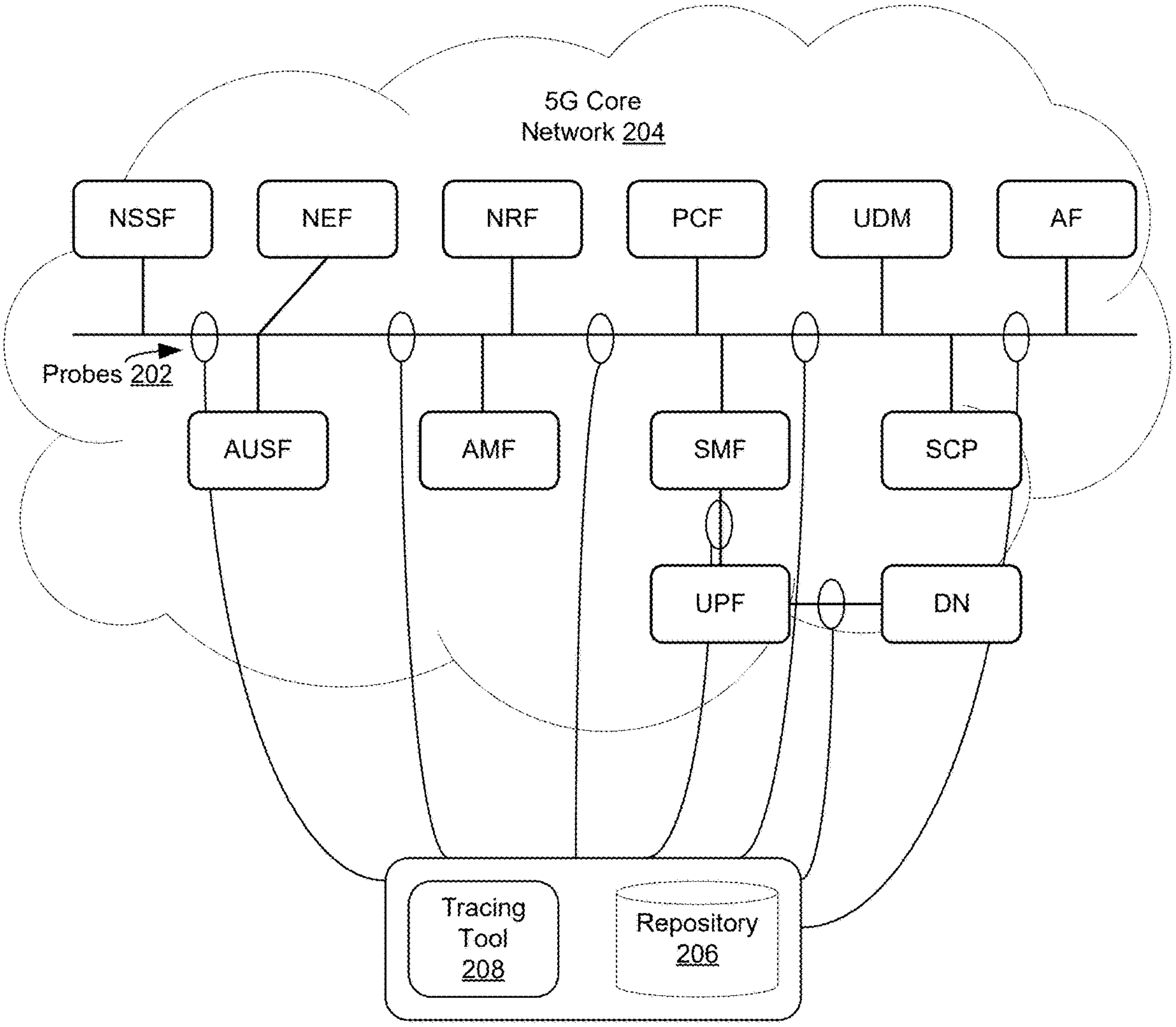
FIG. 2 shows a Fifth Generation (5G) core network with a probing system deployed within it to provide input to a tracing tool for the tracing tool to generate end-to-end call flow traces for subscriber-specific identifiers.

In various implementations, the techniques described herein may be performed by one or more computing devices configured to perform the operations shown at 102, 112, and 122. Such one or more computing devices may comprise a monitoring system, analysis system, remediation system etc. integrated with a probe network having probes deployed in a consumer-facing or lab network. The one or more computing devices may include at least a tracing tool and repository, as shown in FIG. 2 and described further herein. The operations of the techniques, implemented by the one or more computing devices, are shown in greater detail as the flow chart of FIG. 3 and are also described further herein. Additionally, an example computing device capable of serving as the one or more computing devices (or as one of such devices) is illustrated in FIG. 4 and is described further herein.

Prior to identifying the first hostnames, parameters, and/or values, at 102, the one or more computing devices may receive, from the tracing tool, a subscriber-specific identifier (e.g., subscriber-specific identifier 104). This subscriber-specific identifier may be an IMSI, a MSISDN, or other unique identifier for a subscriber to telecommunication services of an operator of the consumer-facing or lab network. In some examples, the subscriber-specific identifier may be associated with a network failure, such as a failed call, and a user of the tracing tool (e.g., an engineer) or an application interfacing with the tracing tool may be seeking an end-to-end call flow that can be used to identify a node or call leg where the failure occurred. Such identification may be important to troubleshooting and remediating the failure.

In some implementations, either the tracing tool or another component of the one or more computing devices may utilize the subscriber-specific identifier to retrieve the call flow traces for the subscriber-specific identifier from a repository of network traffic. Once retrieved, the tracing tool or another component of the one or more computing devices may identify, at 102, the hostnames, parameters, and/or values 108 for each call leg 106 of the call flow traces for the subscriber-specific identifier 104. An example result for this retrieving and identifying is shown in FIG. 1.

In various implementations, the tracing tool or another component of the one or more computing devices may then identify, at 112, second hostnames, parameters, and/or values 116 from NF service discovery procedures 114 based on the first hostnames, parameters, or values 108. This identifying may result from data mining performed by the tracing tool or another component of the one or more computing devices based on the first hostnames, parameters, or values 108. The identifying, at 112, may result in a set of NF service discovery procedures 114 that each have at least one hostname, parameter, and/or value 116 that matches one of the hostnames, parameters, and/or values 108 of the call flow trace. An example result for this identifying is shown in FIG. 1.

At 122, the tracing tool or another component of the one or more computing devices then determine a best match NF service discovery procedure 114 for the call flow trace based on correlation(s) between the first hostnames, parameters, or values 108 and the second hostnames, parameters, or values 116. In some implementations, the NF service discovery procedure 114 that has the most hostnames, parameters, or values 116 that match the hostnames, parameters, or values 108 is selected. FIG. 1 shows selection of such a result with a highest number/percentage of matches 124. The tracing tool or another component of the one or more computing devices then stitches the selected result with the call flow trace to produce an end-to-end call flow, and the end-to-end call flow is then returned through the tracing toll to the querying user or application for further use/analysis.

In some implementations, the operation at 122 may result in multiple best matches. With such a result, the tracing tool or another component of the one or more computing devices may surface the matches to a user or application for further analysis and decision of which match to proceed with. After receiving the user or application selection of one of the matches, the NF service discovery procedure for that match is then stitched with the call flow trace.

In an example implementation, an extraction algorithm performs a call flow extraction for a 5G call flow trace associated with a subscriber using subscriber-specific identifier (e.g., an IMSI). The extraction algorithm analyzes a subscriber-specific trace, and extracts relevant NF hostnames and parameters/values for each of the call legs as shown in Table 1:

TABLE 1

Subscriber Trace Call Flow Parameters/Values

| Subscriber Unique ID | Call Leg NF Nodes | Extracted Source NF Hostname | Extracted Parameters/Values |
|---|---|---|---|
| IMSI | AMF -> SMF | HTTP2 Header User-Agent: <AMF-ID> | PLMN, DNN, TAC, NF Instance ID, NF IP Address |
| | SMF -> AMF | HTTP2 Header User-Agent: <SMF-ID> | |
| | SMF -> PCF | HTTP2 Header User-Agent: <SMF-ID> | |
| | SMF -> CHF | HTTP2 Header User-Agent: <SMF-ID> | |

The extracted hostnames from Table 1 may then be used to data mine NF Service Discovery request/response procedures for relevant call legs, the results shown in Table 2:

TABLE 2

Data Mined NF Service Discovery Procedures - Hostnames/Parameters/Values to Identify & Isolate Service Discovery Request/Response

| Call Leg | Service Discovery Requester Hostname (M: Mandatory) | GET Service Discovery Request Query Values (M: Mandatory; O: Optional) | Service Discovery GET Response Values (M: Mandatory; O: Optional) |
|---|---|---|---|
| AMF -> SMF | HTTP2 Header User-Agent: AMF (M) | Requester NF Type: AMF (M)<br>Target NF Type: SMF (M)<br>PLMN (O)<br>TAC (O)<br>DNN (O)<br><br>Instance ID (O) | SMF IP (M)<br>PLMN (O)<br>TAC (O)<br>DNN (O)<br>AMF Instance ID (O) |

TABLE 2-continued

Data Mined NF Service Discovery Procedures - Hostnames/Parameters/Values to Identify & Isolate Service Discovery Request/Response

| Call Leg | Service Discovery Requester Hostname (M: Mandatory) | GET Service Discovery Request Query Values (M: Mandatory; O: Optional) | Service Discovery GET Response Values (M: Mandatory; O: Optional) |
|---|---|---|---|
| SMF -> CHF | HTTP2 Header User-Agent: SMF (M) | Requester NF Type: SMF (M)<br>Target NF Type: CHF (M)<br>PLMN (O)<br>TAC (O)<br>DNN (O)<br><br>Instance ID (O) | CHF IP (M)<br>PLMN (O)<br>TAC (O)<br>DNN (O)<br>AMF Instance ID (O) |

Next, a correlation algorithm may compare retrieved NF service discovery request/response hostnames, parameters, and/or values (Table 2) with subscriber trace hostnames parameters, and/or values (Table 1) and the best/most-matched, i.e. highest correlated NF service discovery procedure may be selected and stitched for an end-to-end call flow trace.

In a further example implementation, for a SMF->CHF call leg of a call flow trace, the extraction algorithm may produce the results shown in Table 3:

TABLE 3

Subscriber Trace Call Flow Hostnames/Parameters/Values (SMF <> CHF)

| Subscriber-Specific ID | Call Leg NF Nodes | Extracted Source NF Hostname | Extracted Parameters/Values |
|---|---|---|---|
| 310310152020001 | SMF -> CHF | User-Agent: SMF-CASMFD21 | PLMN: 310-310, DNN: fast.t-moblile.com, NF Instance ID: ea679c5a-163a-4ca3-8079-433e1388d418, NF IP Address: 10.194.81.251 |

Based on the SMF< >CHF subscriber-specific call leg extracted hostnames, parameters, and/or values, the data mine algorithm will data mine NF service discovery procedures with below hostnames, parameters, and/or values in the NF service discovery Get request procedure:

HTTP2 Header User-Agent=SMF-CASMFD21

GET Request URI Query: Requester NF Type=SMF

GET Request URI Query: Target NF Type=CHF

Time range: adjustable based on NF cache timer, usually 600s.

The retrieved NF service discovery procedures response may then be fed to the correlation algorithm which may compare retrieved NF service discovery response hostnames, parameters, and/or values with subscriber trace hostnames, parameters, and/or values and the best/most-matched, i.e. highest correlated NF service discovery procedure may be selected and stitched for an end-to-end call flow. As depicted in Table 4, CHF-Disc-1 NF Service Discovery procedure is selected as it has the most correlations/matches with the subscriber trace call leg:

TABLE 4

Hostnames/Parameters/Values - Correlation between data mined NF Service Discovery and Subscriber Call Legs

| ID | Call Leg NF Nodes | Extracted Source NF Hostname | Extracted Parameters/Values | Match with Subscriber Trace Parameters/Values from Table 3 |
|---|---|---|---|---|
| CHF-Disc-1 | SMF -> CHF | User-Agent: SMF-CASMFD21 | PLMN: 310-310, DNN: fast.t-mobile.com, NF Instance ID: ea679c5a-163a-4ca3-8079-433e1388d418, NF IP Address: 10.194.81.251 | 3 out of 4 |

TABLE 4-continued

Hostnames/Parameters/Values - Correlation between data mined NF Service Discovery and Subscriber Call Legs

| ID | Call Leg NF Nodes | Extracted Source NF Hostname | Extracted Parameters/Values | Match with Subscriber Trace Parameters/Values from Table 3 |
|---|---|---|---|---|
| CHF-Disc-2 | SMF -> CHF | User-Agent: SMF-CASMFD21 | PLMN: 310-310, DNN: fast.t-mobile.com, NF Instance ID: ea679c5a-163a-4ca3-8079-433e13882323, NF IP Address: 10.2.2.2 | 2 out of 4 |
| CHF-Disc-3 | SMF -> CHF | User-Agent: SMF-CASMFD21 | PLMN: 310-310, DNN: ims, NF Instance ID: ea679c5a-163a-4ca3-8079-433e1388d418, NF IP Address: 10.3.3.3 | 1 out of 4 |

FIG. 2 shows a 5G core network with a probing system deployed within it to provide input to a tracing tool for the tracing tool to generate end-to-end call flow traces for subscriber-specific identifiers. As shown, the probes 202 may be deployed throughout a 5G core network 204 such that network traffic between any two nodes of the 5G core network 204 may be echoed by the probes 202 to a repository 206 associated with a tracing tool 208. The tracing tool 208 may then utilize the information stored in the repository 206 to perform various types of network analysis, such as call flow traces.

In some examples, the 5G core network 204 can represent a service-based architecture that includes multiple types of NFs that process control plane data and/or user plane data to implement services for user devices, such as UEs. In some examples, the services comprise rich communication services (RCS), a voice-over-New-Radio (VoNR) service, a video-over-New-Radio (ViNR) service, and the like which may include a text, a data file transfer, an image, a video, or a combination thereof. The NFs of the 5G core network 204 can include an Access and Mobility Management Function (AMF), a Session Management Function (SMF), a User Plane Function (UPF), a Policy Control Function (PCF), and/or other NFs implemented in software and/or hardware. Other examples may include an Authentication Server Function (AUSF), a Data Network (DN), an Unstructured Data Storage Function (UDSF), a Network Exposure Function (NEF), a Network Repository Function (NRF), a Network Slice Selection Function (NSSF), Unified Data Management (UDM), a Unified Data Repository (UDR), an Application Function (AF), a 5G-Equipment Identity Register (5G-EIR), a Network Data Analytics Function (NWDAF), a Charging Function (CHF), a Service Communication Proxy (SCP), a Security Edge Protection Proxy (SEPP), a Non-3GPP Inter-Working Function (N3IWF), a Trusted Non-3GPP Gateway Function (TNGF), and/or a Wireline Access Gateway Function (W-AGF), many of which are shown in FIG. 2 as part of the 5G core network 204.

The 5G core network 204 can, in some examples, determine a connection between an Internet Protocol (IP) multimedia subsystem (IMS) that manages communication sessions for a user device, including sessions for short messaging, voice calls, video calls, and/or other types of communications. Such user devices and the IMS can exchange Session Initiation Protocol (SIP) messages to set up and manage individual communication sessions.

As mentioned previously, the 5G core network 204 can be part of a consumer-facing or lab network, and probes 202 can be deployed among communication paths between the nodes of the 5G core network 204. As network traffic is carried between the nodes, the probes 202 may echo that traffic-without interrupting it-back to a repository 206.

The repository 206 and tracing tool 208 may be part of a monitoring or analysis system. The repository 206 may be a database system that receives network traffic from the probes 202 and stores the network traffic. The tracing tool 208 may be any sort of tool, such as a tool for producing a call flow trace. In some examples, the tracing tool 208 may be a NetScout tool. The tracing tool 208, repository 206, and the one or more computing devices implementing them may perform the operations shown in FIGS. 1 and 3 and described further herein.

Figure 3:
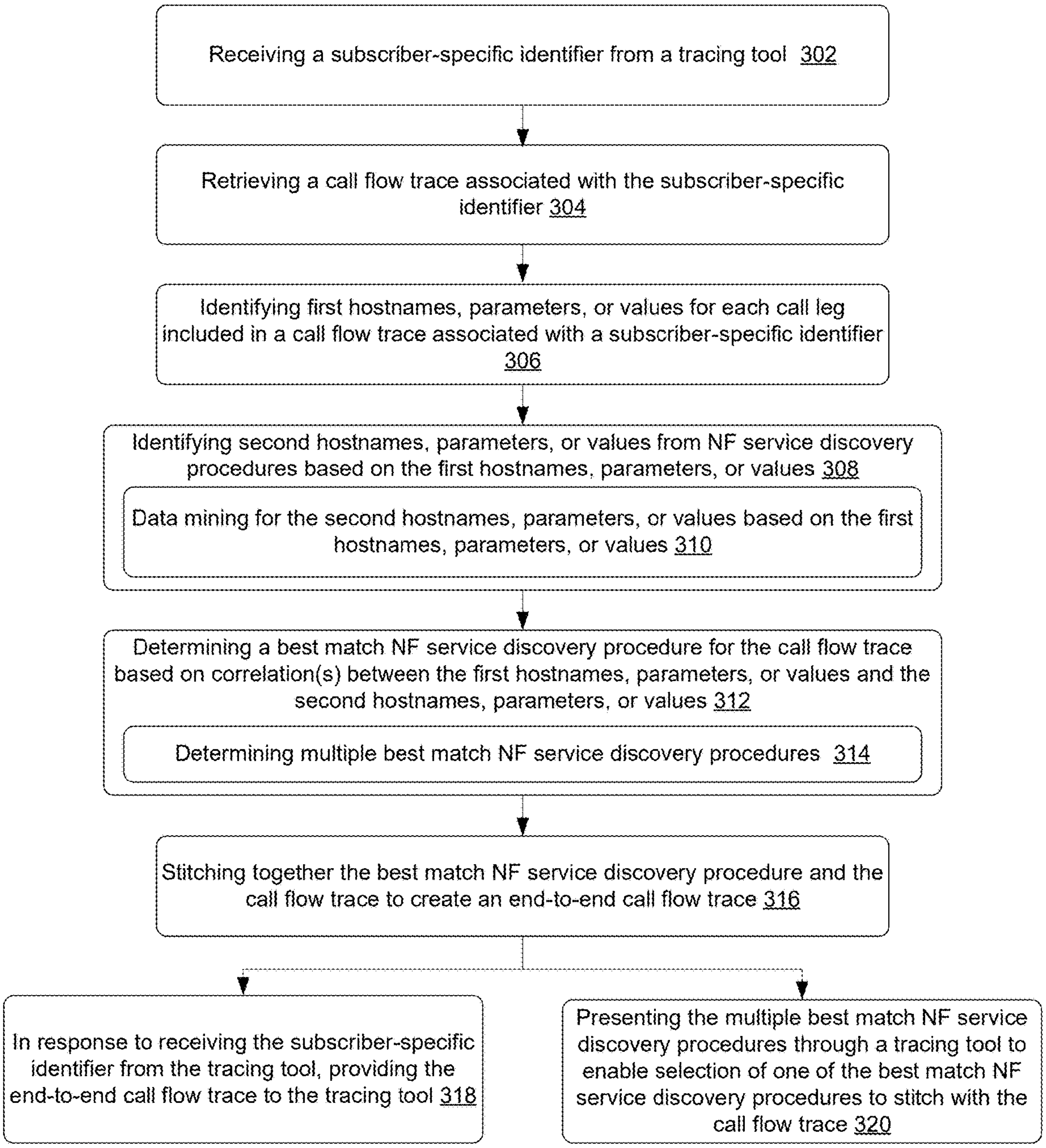
FIG. 3 is a flow diagram of an illustrative process for determining a best match NF service discovery procedure for a call flow trace associated with a subscriber-specific identifier based on correlation(s) between hostnames, parameters, or values taken from each of the NF service discovery procedure and the call flow trace.
Figure 4:
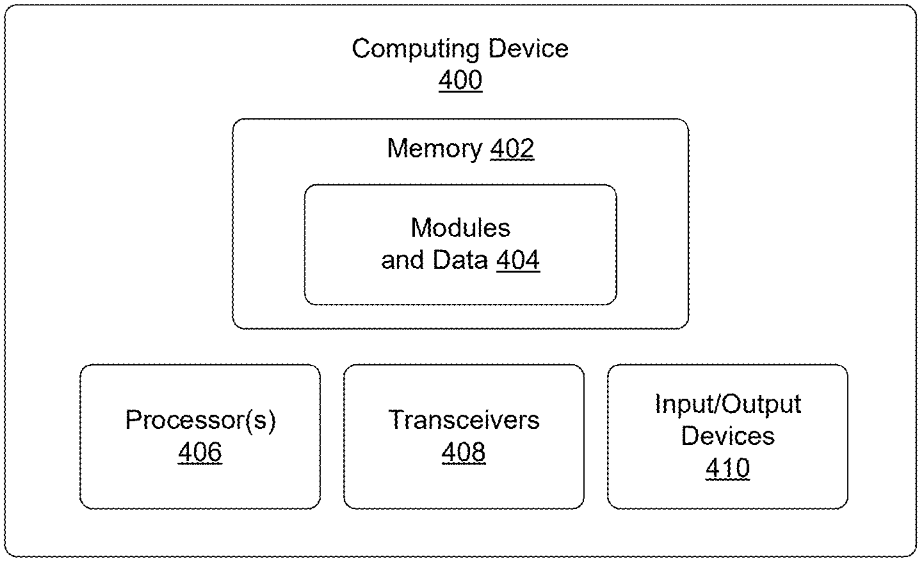
FIG. 4 is a schematic diagram of a computing device capable of implementing functionality of the tracing tool, repository, and/or probe(s).

FIG. 3 illustrates an example process. This process is illustrated as logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 3 is a flow diagram of an illustrative process for determining a best match NF service discovery procedure for a call flow trace associated with a subscriber-specific identifier based on correlation(s) between hostnames, parameters, or values taken from each of the NF service discovery procedure and the call flow trace. As illustrated at 302, one or more computing devices, such as those associated with a tracing tool or probing network system, may receive a subscriber-specific identifier from the tracing tool. The subscriber-specific identifier may be an IMSI or a MSISDN.

At 304, the one or more computing devices may retrieve the call flow trace associated with the subscriber-specific identifier.

At 306, the one or more computing devices identify first hostnames, parameters, or values for each call leg included in a call flow trace associated with a subscriber-specific identifier.

At 308, the one or more computing devices identify second hostnames, parameters, or values from NF service discovery procedures based on the first hostnames, parameters, or values. At 310, identifying the second hostnames, parameters, or values may comprise data mining for the second hostnames, parameters, or values based on the first hostnames, parameters, or values. In some implementations, the NF service discovery procedures do not include any subscriber-specific identifiers.

At 312, the one or more computing devices determine a best match NF service discovery procedure for the call flow trace based on correlation(s) between the first hostnames, parameters, or values and the second hostnames, parameters, or values. At 314, the determining may comprise determining multiple best match NF service discovery procedures.

At 316, the one or more computing devices may stitch together the best match NF service discovery procedure and the call flow trace to create an end-to-end call flow trace.

In some implementations, at 318, the one or more computing devices may provide the end-to-end call flow trace to the tracing tool in response to receiving the subscriber-specific identifier from the tracing tool.

In some implementations, at 320, when there are multiple best match NF service discovery procedures, the one or more computing devices may present the multiple best match NF service discovery procedures through a tracing tool to enable selection of one of the best match NF service discovery procedures to stitch with the call flow trace.

FIG. 4 is a schematic diagram of a computing device capable of implementing functionality of the tracing tool, repository, and/or probe(s). As shown, the computing device 400 includes a memory 402 storing modules and data 404, processor(s) 406, transceivers 408, and input/output devices 410.

In various examples, the memory 402 can include system memory, which may be volatile (such as RAM), non-volatile (such as ROM, flash memory, etc.) or some combination of the two. The memory 402 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information.

The memory 402 can include one or more software or firmware elements, such as computer-readable instructions that are executable by the one or more processors 406. For example, the memory 402 can store computer-executable instructions associated with modules and data 404. The modules and data 404 can include a platform, operating system, and applications, and data utilized by the platform, operating system, and applications. Further, the modules and data 404 can implement any of the functionality for tracing tool 208, repository 206, probes 202, or any other node/device described and illustrated herein.

In various examples, the processor(s) 406 can be a central processing unit (CPU), a graphics processing unit (GPU), or both CPU and GPU, or any other type of processing unit. Each of the one or more processor(s) 406 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 406 may also be responsible for executing all computer applications stored in the memory 402, which can be associated with types of volatile (RAM) and/or nonvolatile (ROM) memory.

The transceivers 408 can include modems, interfaces, antennas, Ethernet ports, cable interface components, and/or other components that perform or assist in exchanging wireless communications, wired communications, or both.

While the computing device need not include input/output devices 410, in some implementations it may include one, some, or all of these. For example, the input/output devices 410 can include a display, such as a liquid crystal display or any other type of display. For example, the display may be a touch-sensitive display screen and can thus also act as an input device or keypad, such as for providing a soft-key keyboard, navigation buttons, or any other type of input. The input/output devices 410 can include any sort of output devices known in the art, such as a display, speakers, a vibrating mechanism, and/or a tactile feedback mechanism. Output devices can also include ports for one or more peripheral devices, such as headphones, peripheral speakers, and/or a peripheral display. The input/output devices 410 can include any sort of input devices known in the art. For example, input devices can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

Although features and/or methodological acts are described above, it is to be understood that the appended claims are not necessarily limited to those features or acts. Rather, the features and acts described above are disclosed as example forms of implementing the claims.

Also, while the descriptions provided herein may be in the context of certain radio access technologies, networks, and network topologies, such as 5G/new radio (NR) mobile communications, the proposed concepts, schemes, and any variations thereof may be implemented in, for and by other types of radio access technologies, networks, and network topologies. Such radio access technologies, networks, and network topologies may include, for example and without limitation, Long-Term Evolution (LTE), Internet-of-Things (IOT), Narrow Band Internet of Things (NB-IOT), vehicle-to-everything (V2X), fixed wireless internet, and non-terrestrial network (NTN) communications. Thus, the scope of the disclosure is not limited to the examples described herein.

What is claimed is:

1. A method comprising:

identifying, by one or more computing devices, first hostnames, parameters, or values for each call leg included in a call flow trace associated with a subscriber-specific identifier;

identifying, by the one or more computing devices, second hostnames, parameters, or values from network function (NF) service discovery procedures based on the first hostnames, parameters, or values;

determining, by the one or more computing devices, multiple best match NF service discovery procedures for the call flow trace based on one or more correlations between the first hostnames, parameters, or values and the second hostnames, parameters, or values; and presenting the multiple best match NF service discovery procedures through a tracing tool to enable selection of one of the multiple best match NF service discovery procedures to stitch with the call flow trace.

2. The method of claim 1, further comprising retrieving the call flow trace associated with the subscriber-specific identifier.

3. The method of claim 1, wherein the subscriber-specific identifier is an international mobile subscriber identity (IMSI) or a mobile station international subscriber directory number (MSISDN).

4. The method of claim 1, wherein the identifying the second hostnames, parameters, or values comprises data mining for the second hostnames, parameters, or values based on the first hostnames, parameters, or values.

5. The method of claim 1, wherein the NF service discovery procedures do not include any subscriber-specific identifiers.

6. The method of claim 1, further comprising stitching together the best match NF service discovery procedure and the call flow trace to create an end-to-end call flow trace.

7. The method of claim 6, further comprising receiving the subscriber-specific identifier from a tracing tool and providing the end-to-end call flow trace to the tracing tool in response.

8. A system comprising:

one or more processors;

programming instructions that, when executed by the one or more processors, cause one or more computing devices of the one or more processors to perform operations including:

identifying first hostnames, parameters, or values for each call leg included in a call flow trace associated with a subscriber-specific identifier;

identifying second hostnames, parameters, or values from network function (NF) service discovery procedures based on the first hostnames, parameters, or values; and determining multiple best match NF service discovery procedures for the call flow trace based on correlations between the first hostnames, parameters, or values and the second hostnames, parameters, or values; and presenting the multiple best match NF service discovery procedures through a tracing tool to enable selection of one of the multiple best match NF service discovery procedures to stitch with the call flow trace.

9. The system of claim 8, wherein the operations further comprise retrieving the call flow trace associated with the subscriber-specific identifier.

10. The system of claim 8, wherein the subscriber-specific identifier is an international mobile subscriber identity (IMSI) or a mobile station international subscriber directory number (MSISDN).

11. The system of claim 8, wherein the NF service discovery procedures do not include any subscriber-specific identifiers.

12. The system of claim 8, wherein the operations further comprise stitching together the best match NF service discovery procedure and the call flow trace to create an end-to-end call flow trace.

13. The system of claim 12, wherein the operations further comprise receiving the subscriber-specific identifier from a tracing tool and providing the end-to-end call flow trace to the tracing tool in response.

14. A non-transitory computer storage medium having programming instructions stored thereon that, when executed by one or more computing devices cause the one or more computing devices to perform operations comprising:

identifying first hostnames, parameters, or values for each call leg included in a call flow trace associated with a subscriber-specific identifier;

identifying second hostnames, parameters, or values from network function (NF) service discovery procedures based on the first hostnames, parameters, or values;

determining multiple best match NF service discovery procedures for the call flow trace based on correlations between the first hostnames, parameters, or values and the second hostnames, parameters, or values; and presenting the multiple best match NF service discovery procedures through a tracing tool to enable selection of one of the multiple best match NF service discovery procedures to stitch with the call flow trace.

15. The non-transitory computer storage medium of claim 14, wherein the operations further comprise retrieving the call flow trace associated with the subscriber-specific identifier.

16. The non-transitory computer storage medium of claim 14, wherein the subscriber-specific identifier is an international mobile subscriber identity (IMSI) or a mobile station international subscriber directory number (MSISDN).

17. The non-transitory computer storage medium of claim 14, wherein the NF service discovery procedures do not include any subscriber-specific identifiers.

18. The non-transitory computer storage medium of claim 14, wherein the operations further comprise stitching together the best match NF service discovery procedure and the call flow trace to create an end-to-end call flow trace.

19. The non-transitory computer storage medium of claim 18, wherein the operations further comprise receiving the subscriber-specific identifier from a tracing tool and providing the end-to-end call flow trace to the tracing tool in response.

20. The non-transitory computer storage medium of claim 14, further comprising receiving the subscriber-specific identifier from a tracing tool and providing an end-to-end call flow trace to the tracing tool in response.

* * * * *